United States Patent [19]
Ehrenfruend

[11] 4,110,269
[45] Aug. 29, 1978

[54] METHOD OF MAKING POLYETHYLENE FOAM
[75] Inventor: Herbert A. Ehrenfruend, Madison, Conn.
[73] Assignee: Olefoam Corporation, Madison, Conn.
[21] Appl. No.: 764,181
[22] Filed: Jan. 31, 1977
[51] Int. Cl.$^2$ ............................................. C08J 9/14
[52] U.S. Cl. ....................................... 521/81; 521/98; 521/908; 260/897 B; 260/901; 264/DIG. 5
[58] Field of Search .......... 260/2.5 HA, 897 B, 2.5 E, 260/2.5 HB, 901; 264/DIG. 5

[56] References Cited
U.S. PATENT DOCUMENTS 3,067,147  12/1962  Rubens et al. ................. 260/2.5 HA
3,810,964   5/1974  Ehrenfruend ................. 260/2.5 HA Primary Examiner—Morton Foelak
Attorney, Agent, or Firm—Chapin, Neal & Dempsey

[57] ABSTRACT

A method of producing a low density polyethylene foam by extruding a melt blend containing polyethylene, an ionomer, a nucleating system and two expanding agents having substantially different vapor pressures and solubility in the melt blend.

4 Claims, No Drawings

METHOD OF MAKING POLYETHYLENE FOAM

BACKGROUND

The present invention relates to the manufacture of a low density polyethylene foam. In particular, it relates to a low density polyethylene foam of improved toughness, resistance to tearing and reduced compression set.

The manufacture of low density (i.e., below 5 pounds per cubic foot) polyethylene foam is primarily achieved by extruding a molten polymer and a normally liquid or gaseous propellant or expanding agent. Prior to actual extrusion, the homogeneous melt is cooled to a temperature at or substantially below the freezing point of the polymer and then issued from the extruder with the release of the propellant with the polymer mass at ambient pressure. With this action, cells originate and grow to a size determined by the equilibrium of pressure of the propellant versus the containing melt strength of the polymer, thus forming a cellular polymeric structure.

In that such materials are generally characterized by a closed cell structure in which the cell walls are permeable to the rapidly expandable propellant, control of the extrusion temperature and gas pressure generated by the propellant are critical factors for the controlled expansion of the polymer mass in order to produce a commercially useful product of uniform cellular consistency.

In recent years, this problem of control has been recognized and various solutions have been proposed in order to overcome the same. For example, U.S. Pat. No. 3,067,147 teaches a method of making cellular polyethylene by placing the molten polymer under the pressure of 1,2-dichlorotetrafluoroethane, Freon 114, blowing agent. This particular blowing agent has a large molecule compared to methane, for example, yet blends well with the polymer melt in the extruder. The resultant relatively high latent heat of vaporization and low vapor pressures during foaming allow for a controlled expansion of the cellular mass. While this method is satisfactory, it does require large amounts of a relatively expensive blowing agent in order to achieve a low density foam.

Another example of a solution to the above may be seen in U.S. Pat. No. 3,810,964 wherein a low density polyethylene foam is produced employing a resinous barrier material in the melt so as to block gas migration. While such a system is effective, the barrier materials tend to make the resultant foam too hard and thus undesirable for many purposes.

It is a principal object of the present invention to provide an improved method of foaming branched chain polyethylene in a more economical manner.

It is another object of the present invention to provide a method of making a polyethylene foam of greater toughness, resistance to tearing and reduced compression set properties.

It is a further object of the present invention to provide a method for producing a reinforced polyethylene foam which is expanded by a mixture of selected expanding agents.

The above and other objects and advantages of the present invention will become more apparent from the following description and claims.

In the preferred practice of the present invention a polyethylene foam is extruded from a blend of polyethylene, an ionomer and a mixture of Freon 12 and Freon 114 (dichlorodifluoromethane and dichlorotetrafluoroethane, respectively) blowing agents. The two blowing or expanding agents have substantially different vapor pressures and solubilities in the melted polymer blend. For example, at a temperature of 200° F, Freon 12 has a solubility in polyethylene of about 26 phr and Freon 114 of about 85 phr.

It has been found that the combined expanding agents in an amount of 8% by weight or less (preferably from about 3% to about 8% by weight) of the melt blend is exceptionally well adapted for use in foaming polyethylene to densities as low as 2 to 3 pounds per cubic foot. The combined expanding agents, preferably employed in a ratio of about 2:1, Freon 114 to Freon 12, are quite economical and when foamed at a temperature below 160° F results in large polymer volume increase in a controlled manner, thus permitting thick cross section profiles with a predictable downstream dimension control and superior economies of production.

In order to employ the economical expanding agent mixture which overcomes the problem of rapid uncontrolled cell growth by utilizing the different partial pressures and solubility in polyethylene, it is necessary to include in the melt blend about 5% to 30% by weight of an ionomer resin which appears to contain the Freon 114 expanding agent after expansion and cooling of the foam so as to limit volumetric contraction thereof without substantially increasing the hardness of the foam. Suitable ionomer resins are typically based on ionically crosslinked ethylene/methacrylic acid copolymers and ethylene/vinyl acetate copolymers. Surlyn 1801, which is manufactured and sold by E. I. du Pont De Nemours & Co., is an example of the former which has been found useful in the practice of the present invention.

In the practice of the present invention it is interesting to note that experimentation has shown a synergistic relationship between the mixture of expanding agents and the presence of the ionomer in the polymer blend. For example, in the use of Freon 114 alone as an expanding agent or with an ionomer, amounts in excess of 8.5% by weight are required in order to produce an acceptable low density foam. Such an amount of expanding agent significantly increases the cost of manufacture and thus is not desirable. As a further example, it has also been found that a mixture of expanding agents other than Freon 12/Freon 114, e.g. Freon 12/Freon 22, results in an unmanageable foam unless a barrier material such as an acrylic resin is also incorporated into the foamable blend.

EXAMPLE I

A mixture of 100 parts by weight of a 0.919 density polyethylene having a melt index of 3.5, 17.5 parts by weight of an ionomer resin (Surlyn 1801), 0.25 parts by weight magnesium silicate as a nucleating agent, and 0.1 parts by weight of a lubricant was fed at a rate of 35 pounds per hour to an extruder operating under the following temperature conditions:

| | |
|---|---|
| Feed zone 1 | 270° F |
| Injection zone 2 | 270° F |
| Injection zone 3 | 230° F |
| Injection zone 4 | 250° F |
| Die zone | 250° F |

A mixture containing 33 parts Freon 12 and 66 parts Freon 114 comprising 8% by weight of the polymer blend was injected into the melt by means of a metering pump.

The material was extruded through a ⅛ inch by 3 inch slot and the resultant foam was 1 inch by 5 inches with a density of 2.4 pounds per cubic foot. Upon setting for 24 hours the foam assumed dimensions of 15/16 inch by 4⅞ inches and had a density of 2.47 pounds per cubic foot.

Testing of this material revealed a compressive modulus (ASTM D-1056) at 50% compression of 30 psi, a tensile strength (ASTM D-412) of 30 psi and a Ball Rebound Resilience (ASTM D-1564) of 19%.

EXAMPLE II

The extrusion test of Example I was repeated, but with the exclusion of the ionomer from the melt blend formulation.

The resultant foam was uniform in dimension during extrusion. However, after setting for 24 hours it was severely shrunken and misshapen with a density of about 4.7 pounds per cubic foot.

EXAMPLE III

The extrusion test of Example I was repeated, but only Freon 12 was used as an expanding agent.

The foam extrudate was not manageable upon emergence from the die and its cellular structure collapsed within minutes after foaming.

EXAMPLE IV

A large extruder operating under the following temperature conditions was fed with the polymer blend formulation of Example I at a rate of 208 pounds per hour:

| | |
|---|---|
| Feed zone 1 | 390° F |
| Injecton zone 2 | 380° F |
| Injection zone 3 | 380° F |
| Injection zone 4 | 165° F |
| Die zone | 170° F |

A mixture of expanding agents comprising 4.4% by weight Freon 114 and 2.1% by weight Freon 12 was injected into the melt flow and the resultant material was extruded through a 5½ inch by ⅛ inch die opening.

The foam board produced had dimensions of 2 inches by 13 inches and a density of 3.0 pounds per cubic foot. The mechanical properties of this foam product were substantially the same as those given for the foam product of Example I.

What is claimed is:

1. A method of producing a low density polyethylene foam comprising charging an extruder with a polyethylene resin, from about 5% to 30% by weight of an ionomer resin selected from the group consisting of ionically crosslinked copolymers of ethylene/methacrylic acid and ethylene/vinyl acetate, and a nucleating agent, heating said charge so as to melt said resins, injecting an expanding agent mixture consisting of dichlorodifluoromethane and dichlorotetrafluoroethane into said melt charge in an amount of 8% or less by weight and said mixture comprises approximately a 2:1 ratio of dichlorotetrafluoroethane to dichlorodifluorourethane and extruding said melt charge to form said foam.

2. The method of claim 1 wherein said ionomer resin is an ethylene/methacrylic acid copolymer based ionomer resin.

3. The method of claim 1 wherein said expanding agent mixture is injected in an amount of from about 3% to 8% by weight.

4. The method of claim 1 wherein said ionomer resin is an ethylene/vinyl acetate copolymer based ionomer resin.

* * * * *